3,824,215
CROWN ETHER POLYMERS PREPARED FROM CHLORAL, BROMAL OR GLYOXYLIC ACID
Tohru Takekoshi, Scotia, and Jimmy L. Webb, Ballston Lake, N.Y., assignors to General Electric Company
No Drawing. Filed Mar. 20, 1973, Ser. No. 343,140
Int. Cl. C08g 5/00
U.S. Cl. 260—52
4 Claims

ABSTRACT OF THE DISCLOSURE

Crown ether polymers are prepared from the reaction of a crown ether containing nuclearly bonded hydrogen and either chloral, bromal, or glyoxalic acid in the presence of a strong acidic catalyst.

---

This invention is concerned with crown ether polymers and methods for making the same. More particularly, the invention relates to a polymeric composition composed of recurring structural units of the formula I 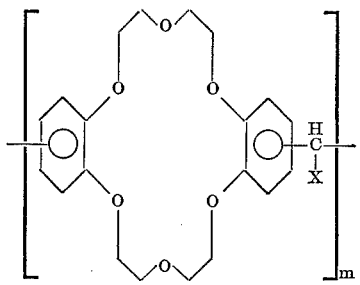

where X is a member selected from the class of —COOH and —$CY_3$ radicals, where Y is chlorine or bromine, and m is a whole number in excess of 1, for instance, 10 to 1000 or more.

The invention is also concerned with a process for making the aforesaid polymers of formula I which comprises reacting a crown ether of the formula II 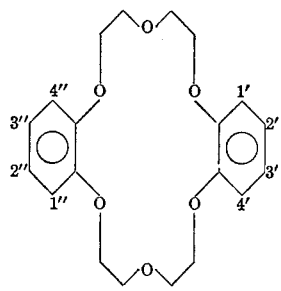

(identified as 2,3,11,12-dibenzo-1,4,7,10,13,16-hexaoxacyclooctadeca-2,11-diene) with a carbonyl compound of the formula III 

or its hydrated form

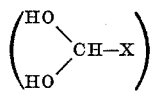

in the presence of a strongly acidic catalyst, where X has the meaning given above.

In the reaction of the crown ether with the carbonyl compound, all that is necessary is to have available a nuclearly bonded hydrogen on each of the benzene rings comprised in the crown compound. Since it is not certain at which point in the benzene rings the carbonyl compound attaches to the crown compounds, it is intended to be included within the scope of formula I, all polymers wherein the attachment of the residue of the carbonyl compound to the crown ether nucleus can be on the 2' or 3' of one benzene ring and on the 2" or 3" of the other benzene ring shown in formula II for the specific diene crown ether. It is thus intended that all isomeric configurations of the polymer adding onto the two benzene rings in the above positions to form the linear structure are encompassed by the scope of the claims.

The crown ether employed in the practice of the present invention, including other crown ethers which are also known, are found disclosed in U.S. Pat. 3,622,577, issued Nov. 23, 1971. In this patent are described a number of crown ethers which can be used in the practice of the present invention in place of the crown ether of formula II as well as numerous methods for preparing the same. By reference, this patent together with all its disclosures and teachings are made part of the disclosures of the instant patent application, not only as to methods for making the crown ethers, but also for descriptions of the different types of crown ethers capable of formation of polymers. It will be noted that the aforesaid patent refers to these macrocyclic polyethers as "crown compounds" whereas the applicants refer to the same materials as "crown ethers."

It has been known in the past that aromatic compounds such as benzene, diphenyl oxide, etc., can be reacted with materials such as chloral to form simple compounds by a condensation reaction. We have now discovered that the reaction of an aromatic compound containing nuclearly bonded hydrogen, specifically crown ethers, with chloral, bromal and glyoxalic acid (hydrates of these carbonyl compounds are intended to be included in the definition of "carbonyl compounds"), can be carried out in such a manner that one is able to obtain polymers of considerable molecular weight and intrinsic viscosity. The key to obtaining the polymeric compositions resides in the use of a strong acidic catalyst (hereinafter defined) for carrying out the reaction. By means of such conditions, one is able to obtain high molecular weight, linear polymers capable of forming strong films and capable of being molded to form useful products in the molding, insulation, and protective arts.

The term "strong acidic catalyst" as employed in the practice of the present invention is intended to mean an acidic agent (including anhydride of the acid) whose acid strength as measured on the Hammett $H_0$ scale, is at least as strong as trifluoroacetic acid. On the Hammett $H_0$ scale, the values are called Hammett $H_0$ acidity functions and range from positive to negative numbers. The more negative the value, the stronger the acid. For a more complete discussion of the Hammett $H_0$ acidity functions, reference is made to the book "Acidity Functions" by Colin H. Rochester, Academic Press, New York (1970). This book and its reference are hereby incorporated by reference for a teaching concerning acidity functions of various acids and the factors which govern acidity functions of various systems in which the acids are dissolved.

Since water is produced in the condensation of the crown ether and the carbonyl compound, the amount of acidic medium or acidic catalyst which can be used should be enough to maintain the acidity of the system as described above. Generally, the concentration of the acidic catalyst should be present in an amount equal to at least 15 to 20 mol percent of the molar concentration of the crown ether or carbonyl compound. Larger molar concentrations of the acidic catalyst are often advantageously employed in order to increase the rate of reaction. Excess amounts of the acidic catalyst can additionally be used as solvents for the reaction.

Among the acidic (including anhydrides) catalysts which are useful in the preparation of the polymers of the instant invention may be mentioned the following where the parenthesis figure is the value on the Hammett $H_0$ scale: trifluoroacetic acid (—3.3), trifluoroacetic anhydride, methanesulfonic acid (—8.0), trifluoromethane-sulfonic acid (—14.0), trifluoromethane sulfonic anhydride, monofluorophosphoric acid, difluorophosphoric acid (—8.0), hydrogen fluoride (—11.9), boron trifluoride, fluoroboric acid, etc. Mixtures of the aforesaid acids can also be used.

The means whereby polymers herein defined and the process for making such compositions may be practiced can be varied widely and to a considerable extent depend on the carbonyl compounds used and the acidic catalyst employed. Generally, approximately 1 mol of the crown ether is used per mol of the carbonyl compound. Slight variations in molar excesses may be employed so that generally one reactant may be in a molar excess of about 0.001 to 0.05 mol over the other reactant. Persons skilled in the art will have no difficulty in determining the conditions for making the polymeric compositions of formula I.

The temperatures at which reaction is caused to take place can also be varied widely and are advantageously within the range of from about 0° C. to 100° C., although it is possible to employ lower or higher temperature conditions depending on the ingredients used, the reaction products sought, time of reaction, the kind of concentration of the acidic catalyst or medium, etc. In addition to using atmospheric pressure, superatmospheric pressures and subatmospheric pressures may be employed again depending upon the other conditions of reaction, the ingredients used, the speed at which it is desired to effect reaction, etc.

The time of reaction can be varied within a wide range, depending on the ingredients used, the temperature, the acidic catalyst and concentration of the latter, etc. It has been found that times varying from about 15 minutes to as much as 10 to 15 hours are usually sufficient to obtain the desired yield and completion of the reaction.

Generally, common inert solvents (i.e., inert to the reactants and reaction product) are advantageously employed in the practice of the invention. Among such solvents may be mentioned, for instance, nitrobenzene, chlorobenzene, trichloroethylene, tetrachloroethane, orthodichlorobenzene, methylene chloride, chloroform, trifluoroacetic acid or anhydride, etc. Although solvents are not absolutely essential, it has been found that the solvent (which can vary widely in concentration) acts as a diluent to reduce the viscosity and medium for more intimate contact between the reactants, and also allows the acidic catalyst to exert its maximum influence on the course of the reaction. Also it is possible by the use of solvents to maintain better control of the reaction which is often exothermic. Mixtures of solvents can also be employed. In general, the amount of solvent can vary from 10 to 100%, or more, by weight, based on the weight of the reactants.

Once the reaction is carried out, the polymerization is usually terminated by pouring the reaction mixture into a suitable non-solvent for the polymer, such as methanol. The polymer which generally precipitates, can be removed by filtration, washed with additional methanol, and then dried in vacuum at temperatures ranging from about 50 to 80° C. Redissolving the polymer in solvents therefor, such as chloroform, and reprecipitation with methanol will give still purer, less colored polymers.

In order that those skilled in the art may better understand how the present invention may be practiced, the following examples are given by way of illustration and not by way of limitation.

For brevity, in the following examples, the reactants used will be identified as follows:

CHART 1

Cb1—chloral
Cb2—glyoxalic acid hydrate

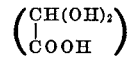

TFA—trifluoroacetic acid

The intrinsic viscosities [$\eta$] in the examples were measured at 25° C. in chloroform. The thermal gravimetric analyses (TGA) were measured at a heating rate of 10° C. per minute; the temperature at which weight loss began is identified as $T_{d_0}$; the temperature at which 5% weight loss occurred is identified as $T_{d_5}$. The glass transition temperature ($T_g$) was measured by differential scanning calorimetry. All reactions were conducted under a nitrogen blanket. The figures in parenthesis for elemental analyses are the theoretical calculations for the elements.

EXAMPLE 1

About 13.61 grams (0.04 mol) of the crown ether and 3.52 grams (0.04 mol) glyoxalic acid hydrate were placed in a three-necked reaction vessel equipped with a stirrer, thermometer, and gas inlet valve. About 80 ml. trifluoroacetic acid was added and the resulting mixture was stirred at room temperature (about 27–30° C.) for about 3 hours. At the end of this time, while stirring the solution, $BF_3$ gas was introduced through the gas inlet tube while maintaining a temperature of about 30–35° C., over a period of 15 minutes until about 5.0 grams of $BF_3$ had been introduced. Thereafter, the solution was stirred again at room temperature for about ½ hour during which time the viscosity of the solution increased. An additional 40 ml. trifluoroacetic acid was added and the solution further stirred for about 1.5 hours, thereafter further diluted with additional 40 ml. trifluoroacetic acid, and 1.2 grams $BF_3$ gas introduced over a period of 10 minutes. The resulting solution was stirred at room temperature for about ½ hour, and thereafter a mixture of 20 ml. trifluoroacetic acid and 5 ml. water was added to the reaction mixture to quench reaction. The polymer was precipitated by pouring the solution into methanol, the precipitated polymer was removed, washed with water and dried under vacuum to give 15.05 grams of a white polymer (95.7% yield based on the weight of the crown ether employed). This polymer was composed of recurring structural units of the formula

IV

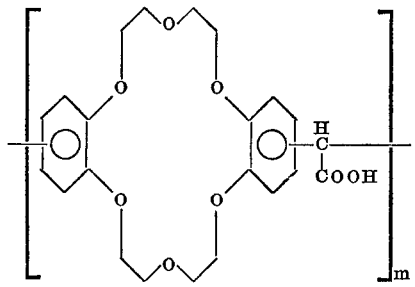

where $m$ is a whole number greater than 1. About 7 grams of the polymer was esterified in a mixture of 50 ml. methanol, 100 ml. chlorobenzene, and 0.1 ml. $H_2SO_4$. The reaction product was worked up similarly as the above to yield the methyl ester of the above-mentioned crown ether polymer whose intrinsic viscosity in chloroform was equal to 0.60 dl./g.

EXAMPLE 2

11.11 grams (0.03 mol) of the crown ether and 4.54 grams (0.03 mol) choral were placed in the same equipment as used in Example 1, and 50 ml. chloroform was added. While stirring the mixture at room temperature, 2.05 grams $BF_3$ gas was introduced into the solution at a rate of about one bubble per second for a period of 20 minutes. During this time, the reaction mixture tended to heat up so that external cooling means was employed to maintain room temperature in the reaction mixture. The solution was then further stirred for one hour at room temperature after which $BF_3$ gas was again introduced causing the formation of a large amount of precipitate. At this point, the $BF_3$ addition was terminated and 10 ml. trifluoroacetic acid was added causing the precipitate to dissolve. The solution was then stirred at about 35° C. for one hour during which time the viscosity increased and a phase separation occurred. 15 ml. trifluoroacetic acid was added and the mixture was saturated again with $BF_3$ gas while stirring the mixture. After further stirring at room temperature for about 3 hours, the solution was poured into methanol to precipitate the polymer. This gave a yield of about 14.34 grams (95.1% yield based on the weight of the crown ether). The intrinsic viscosity of this polymer in chloroform was 0.38. A thin film cast from this polymer, was quite flexible, transparent, and strong. This film showed good selective permeability to potassium ions as shown by the registering of a potential of 54 millivolts (theoretical 59 millivolts) between two solutions of KCl in concentrations of 0.1N and 0.01N separated by this film. Such films can be used in the extraction and analysis of alkali metal ions and in blood sensors. This polymer was composed of recurring structural units of the formula V
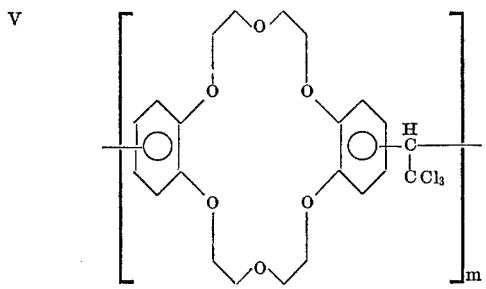

where $m$ is a whole number greater than 1.

The following table shows the results of elemental analyses on the polymers, the TGA's of the polymer and the glass transition temperatures found for each of the two polymers.

TABLE

| Example number | Elemental analyses found, percent | | | TGA,° C. | | | | $T_g$,°C. |
| --- | --- | --- | --- | --- | --- | --- | --- | --- |
| | | | | Air | | $N_2$ | | |
| | C | H | Cl | $T_{d_0}$ | $T_{d_5}$ | $T_{d_0}$ | $T_{d_5}$ | |
| 1 | 60.4 (60.3) | 5.6 (6.08) | | 270 | 317 | 285 | 328 | 147 |
| 2 | 53.6 (53.94) | 4.6 (4.73) | 21.5 (21.72) | 230 | 305 | 257 | 305 | 147 |

EXAMPLE 3

This example illustrates the preparation of a copolymer made from the crown ether with both the chloral and the glyoxalic acid hydrate in equimolar concentrations. More particularly, using the equipment of Example 1, 9.12 grams (0.025 mol) of the crown ether was added to a mixture of 20 ml. trifluoroacetic acid, 10 ml. chloroform, 1.864 grams (0.0127 mol) chloral, and the resulting solution was cooled to room temperature, while about 1.43 grams $BF_3$ gas was introduced slowly over a period of 20 minutes. The temperature was maintained below 10° C. during the $BF_3$ introduction by means of external cooling. The resulting solution was stirred at room temperature for 1.5 hours after which 40 ml. trifluoroacetic acid and 1.178 grams (0.127 mol) glyoxalic acid hydrate was added, and the mixture was stirred again at room temperature for about one hour. $BF_3$ gas was then bubbled in until the solution became cloudy. The resulting emulsion which formed was stirred at room temperature for two hours during which time the viscosity of the mixture increased rapidly. Thereafter the mixture was precipitated by pouring into methanol to give 14.06 grams (almost quantitative yield) of a copolymer composed of recurring structural units of formula IV and formula V. About 2 grams of this copolymer was esterified with 20 ml. methanol, 60 ml. chlorobenzene and 0.05 ml. sulfuric acid, the resulting esterified polymer worked up similarly as in Example 1 and its intrinsic viscosity was determined in chloroform to be 0.51 dl./g.

EXAMPLE 4

This example illustrates the preparation of a copolymer wherein the proportions of the chloral and the glyoxalic acid hydrate were different from the proportions of the latter two ingredients in Example 3. More particularly, 9.17 grams (0.025 mol) of the crown ether, 3.37 grams (0.023 mol) chloral were dissolved at room temperature in a mixture of 20 ml. trifluoroacetic acid and 10 ml. chloroform. While the resulting solution was stirred at a temperature of about 10° C., $BF_3$ gas was bubbled through the solution over a period of about 15 minutes until about 0.51 gram of $BF_3$ was absorbed. The temperature of the reaction mixture was allowed to rise to room temperature over a period of 15 minutes at which time the viscosity increased rapidly. After further stirring at room temperature for about 1.5 hours, 20 ml. trifluoroacetic acid and 0.2106 gram (0.0023 mol) glyoxalic acid hydrate were added at once and the solution continued to stir at room temperature. As the solid glyoxalic acid hydrate dissolved, the viscosity of the solution increased markedly. The dissolution of the glyoxalic acid took about 20 minutes from the time of the first addition to form a two-phase viscous suspension. The reaction mixture was diluted with 10 ml. TFA and 10 ml. chloroform to reduce the viscosity. $BF_3$ gas was again bubbled through the solution over a period of 5 minutes, and the mixture was stirred for an additional hour at room temperature, after which the reaction mixture was poured into methanol to precipitate 12.32 grams (about 100% yield) of a polymer composed of recurring structural units the same as those described in Example 3. However, the ratio of the units were in the same ratio as the chloral and the glyoxalic acid hydrate used, namely, 90 mol percent of the former and 10 mol percent of the latter.

EXAMPLE 5

Empolying the same conditions as described in Example 2, the crown ether can be reacted in equimolar proportions using bromal in place of chloral as the carbonyl compound. This will produce a polymer composed of recurring structural units similar to formula V with the exception that instead of the grouping

in the recurring unit, one would have a repeating unit with the

grouping substituted thereon.

It will of course be apparent to those skilled in the art that, as shown in the preceding examples, other polymers from the crown ether and the carbonyl compound consisting of glyoxalic acid (or the hydrate thereof), can be esterified to form numerous ester polymers characterized by the generic formula

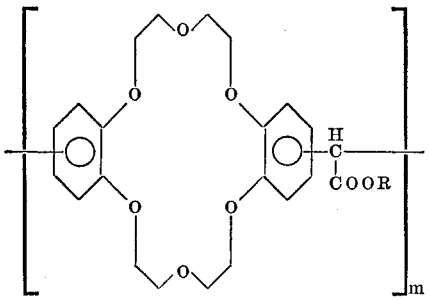

where R is a monovalent hydrocarbon of from 1 to 6 carbon atoms, and m has the meaning given above.

It will be obvious that in addition to ester polymers, one can also prepare amide polymers using $NH_3$ or $RNH_2$ in combination with the polymers derived from the crown ether and the glyoxalic acid.

The crown ether polymers of formula I wherein X is —$CY_3$ radical with Y being chlorine or bromine, although having good heat stability, nevertheless suffer some effects from applications using these polymers at temperatures in excess of 250° C. It is possible to improve the heat resistance of these polymers and to further reduce their flammability and their tendency to emit smoke by dehydrohalogenating the crown ether polymers by treatment with an organic tertiary diamine and an anhydrous, inorganic base, such as potassium carbonate, sodium carbonate, sodium oxide, etc. Any organic tertiary diamine, such as tetramethylbutylene diamine, tetraethyl propylene diamine, 1,5-diazabicyclo[4.3.0]non-5-ene, 1,5-diazabicyclo[5.4.0]undec-5-ene. 1,8-bis(dimethylamino)naphthalene, etc. can be used for the purpose. Broadly any compound capable of acting as a hydrohalide acceptor can be used for the purpose, with the inorganic base being capable of accelerating the dehydrohalogenation and permitting the use of far smaller amounts of the diamine than would ordinarily be necessary. When such dehydrohalogenation is carried out, the crown ether polymer will be composed of units corresponding to the general formula

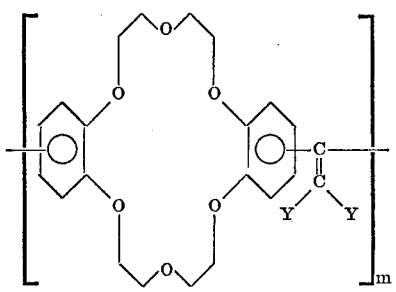

where Y is either chlorine or bromine and m is a whole number greater than 1.

More particular directions for preparing dehydrohalogenated polymers from precursor polymers similar to those of formula I may be found in a copending application Ser. No. 343,139, filed concurrently herewith and assigned to the same assignee as the present invention. By reference all the disclosures, teachings and techniques described in the aforementioned patent application for dehydrohalogenation of the crown ether polymers of formular I are included n the description and disclosures of the instant application.

The compositions of the present invention have application in a wide variety of physical shapes and form, including the use as films, molding compounds, coatings, etc. When used as films or when made into molded products, these polymers, including laminated products prepared therefrom, possess good physical properties. Films formed from the polymeric compositions of this invention may be used in applications where many films have been used previously. Thus, the compositions of the present invention can be used in automobile applications for decorative and protective purposes, and as insulation in transformers, as dielectric capacitors, as coil and cable wrappings (form wound coil insulation for motors), for containers and container linings; in laminating structures where films of the present composition or where solutions of the claimed compositions of matter are applied to various types of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the compositions of the present invention as overcoats on other types of insulation is not precluded.

Applications which recommend these polymers (which advantageously have an intrinsic viscosity $[\eta]$ of at least 0.15 dl./g. when measured in $CHCl_3$) include their use as binders for asbestos fibers, carbon fibers, and other fibrous materials. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as epoxy resins, phenoladehyde resins, urea-aldehyde resins, alkyd resins, etc.; cellulosic material such as paper, inorganic and organic esters of cellulose such as cellulose acetate; cellulose ether, such as methyl cellulose, ethyl cellulose, benzyl cellulose, etc. In some instances, plasticizers and other modifying agents may be used in combination with the claimed polymers. These polymers containing halogen, including low moleculer weight products, thereof are useful themselves or as additives to other polymers for producing products having low flammability.

It will of course be apparent to those skilled in the art that in addition to the compositions specifically referred to in the foregoing examples, other crown ethers or compounds, solvents, catalysts, etc., many examples of which have been described above, may be employed without departing from the scope of the invention. The processing techniques may be varied widely employing the many conditions recited previously.

What we claim as new and desire to secure by Letters Patent of the United States is:

1. A composition of matter composed of recurring structural units of the formula

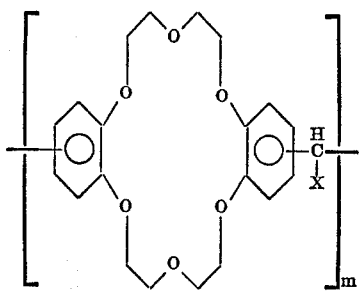

where X is a member selected from the class of —COOH and —CY$_3$ radicals, where Y is chlorine or bromine, and m is a whole number in excess of 1.

2. A polymer composed of recurring structural units of the formula

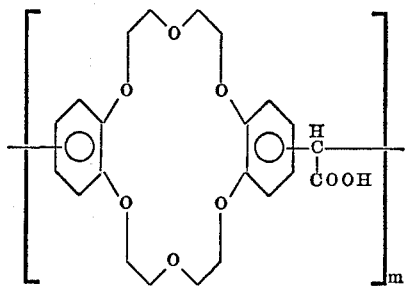

where m is a whole number greater than 1.

3. A polymer composed of recurring structural units of the formula

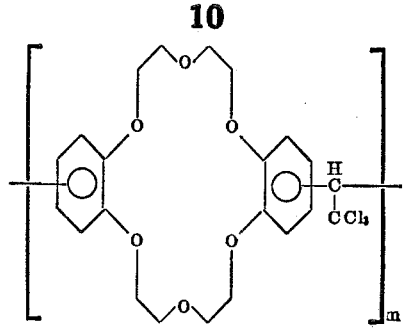

where m is a whole number greater than 1.

4. A polymer composed of recurring structural units of the formula

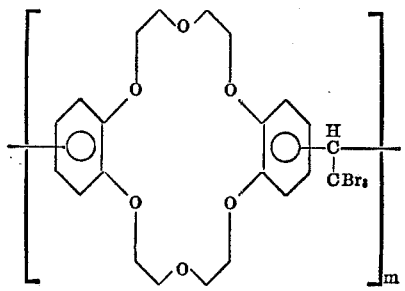

where m is a whole number greater than 1.

References Cited
UNITED STATES PATENTS
3,622,577  11/1971  Pedersen _____ 260—248 NS HOWARD E. SCHAIN, Primary Examiner U.S. Cl. X.R.

117—128.4, 132 BF; 161—198, 205, 257; 260—14, 17.2, 33.8 R, 38, 831, 839